United States Patent [19]

Banks

[11] Patent Number: 4,691,517
[45] Date of Patent: Sep. 8, 1987

[54] LATERALLY OSCILLATING NITINOL ENGINE

[76] Inventor: Ridgway Banks, 7411 Park Vista, El Cerrito, Calif. 94530

[21] Appl. No.: 929,507

[22] Filed: Nov. 12, 1986

[51] Int. Cl.[4] ............................................. F03G 7/06
[52] U.S. Cl. ........................................ 60/527; 60/529
[58] Field of Search ................................... 60/527, 529

[56] References Cited

U.S. PATENT DOCUMENTS 3,913,326 10/1975 Banks .................................... 60/527
4,450,686 5/1984 Banks .................................... 60/527
4,563,876 1/1986 Banks .................................... 60/527

Primary Examiner—Stephen F. Husar
Attorney, Agent, or Firm—Bruce & McCoy

[57] ABSTRACT

A simple nitinol wire powered engine which employs a pair of interconnected drive members which oscillate in a horizontal plane about two different axes of rotation.

3 Claims, 4 Drawing Figures

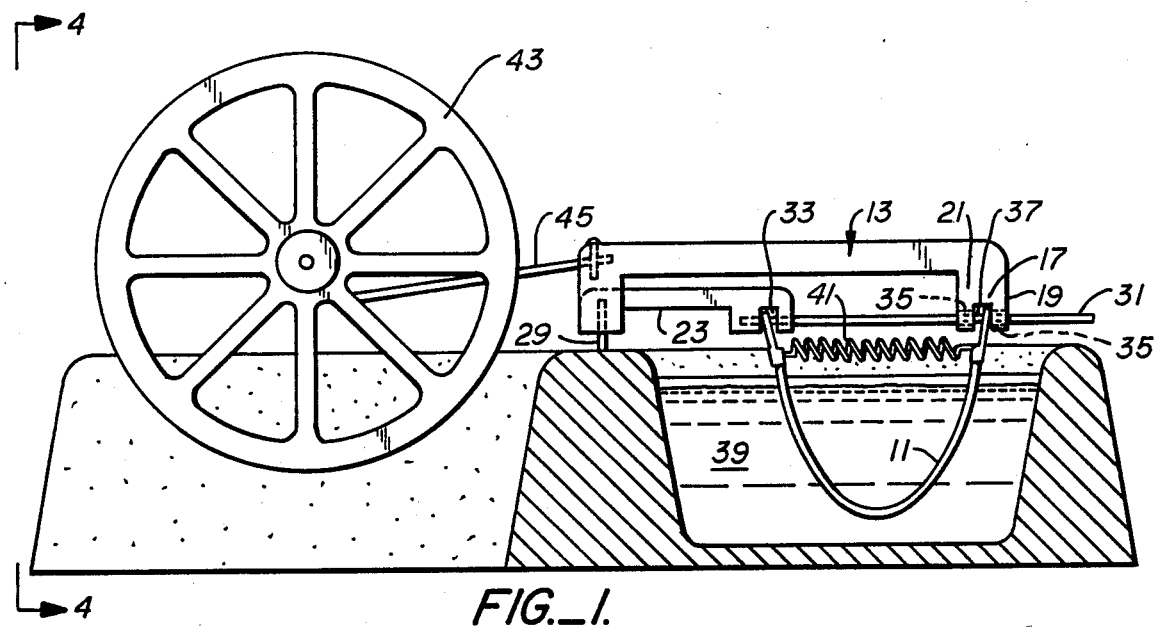
FIG._1.
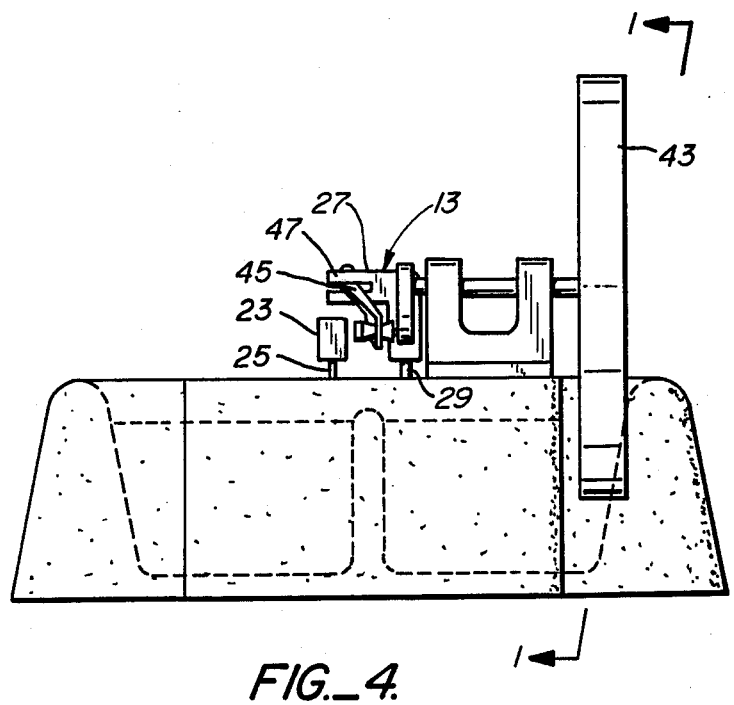
FIG._4.

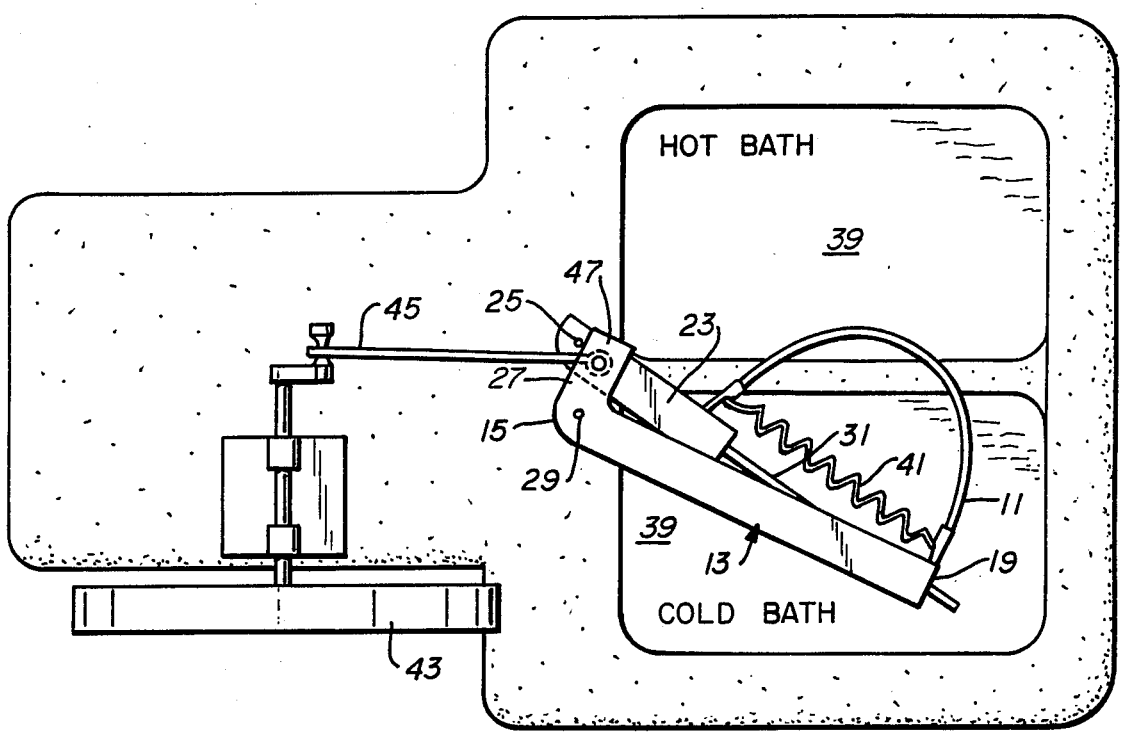
FIG._2.
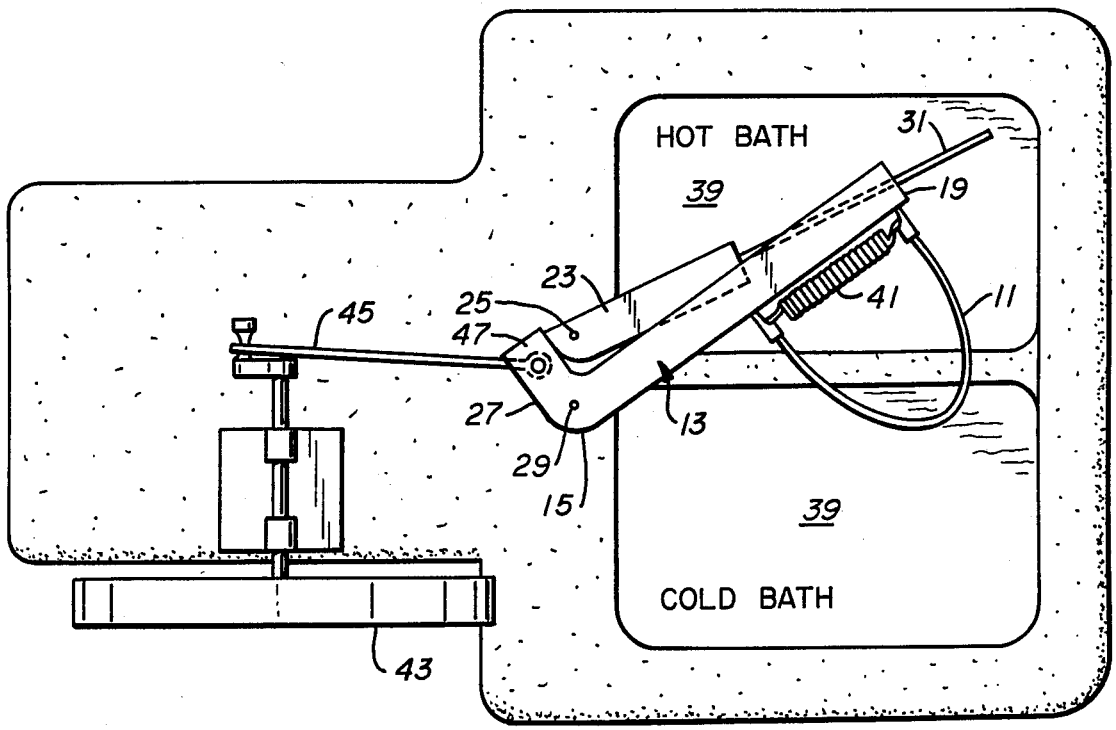
FIG._3.

LATERALLY OSCILLATING NITINOL ENGINE

BACKGROUND OF THE INVENTION

1. Field of the Invention

The present invention relates to heat engines and more particularly to a single wire nitinol powered heat engine.

2. Description of the Prior Art

The inventor of the present invention is also the inventor of the Banks Engine, U.S. Pat. No. 3,913,326, for Energy Conversion System, issued Oct. 21, 1975, which employed bent wires and was the first proven reliable nitinol powered engine. The "Background Of The Invention" section of that patent sets forth in part the status of the prior art at the time of that invention. The "Summary Of The Invention" section of that patent describes the thermodynamic working material, which powers the engine, as a thermally responsive memory material, such as nitinol. The same material is used to power the present invention. The thermally responsive materials which demonstrate these thermal response characteristics have come to be known as the shape memory effect class of materials.

Subsequent to the development of the original engine, the inventor developed an improved engine to extract the tensile energy of straight nitinol wire. That engine is disclosed in the U.S. Pat. No. 4,257,231, for Heat Engine, issued Mar. 24, 1981. The "Background Of The Invention" section of that patent sets forth in part the status of the prior art which had developed to the time of that invention. The "Summary Of The Invention" section of that patent describes the problems with extracting energy from straight wires of nitinol or any other thermally responsive shape memory effect material.

In March of 1983, the inventor filed a patent application on a single wire nitinol engine which demonstrated a much lighter and simpler construction than had been known for providing an operable nitinol engine. That application issued as U.S. Pat. No. 4,450,686 on May 29, 1984.

In February of 1985, the inventor filed an application for a linear output nitinol engine which overcame the problems of extracting usable energy from the heat engine disclosed in U.S. Pat. No. 4,257,231. The application resulted in U.S. Pat. No. 4,563,876 for a Linear Output Nitinol Engine, issued Jan. 14, 1986. The "Summary Of The Invention" section of that patent sets forth three particular areas of design in which improvements were disclosed in the patent.

The disclosures of the above referenced patents are incorporated herein by reference for a more complete understanding of the present invention. Additional basic wire powered mechanisms have now been conceived for extracting energy from shape memory materials such as nitinol, and one of these mechanisms is described by the present disclosure. Another wire powered engine is described in the disclosure filed concurrently herewith.

SUMMARY OF THE INVENTION

The present invention is a single wire laterally oscillating nitinol engine which comprises a first L-shaped drive member journalled for pivoting with horizontal oscillation about the juncture of the legs of the L-shaped member. A second drive member is journalled for pivoting about a point proximate the end of the shorter leg of the L-shaped first drive member at a point spaced from the pivot journal of the L-shaped member. A bearing block is secured to the end of the longer leg of the L-shaped member and has a guide hole therethrough. The second member extends through the guide hole and is arranged to reciprocate therein.

A shape memory alloy element, such as nitinol wire, is disposed in U-shaped flexure secured at its ends to the bearing block and to the second member at a position intermediate the sliding connection with the bearing block and the pivotal connection with the second member. A means is provided for disposing the shape memory element whereby as the drive members oscillate about their journals, the element alternately dips into one bath and then the other. A spring means disposed in tension interconnects the ends of the element and an energy storage means is connected to the drive members to absorb the energy output of the engine. Spacial relationship between the bearing block at end of L-spaced first drive member and the pivot point of the second drive member is such that oscillation in one direction effects an opening or increase of the distance between said points, while oscillation in the opposite direction effects a closing or decrease of said distance. In practice, forceful opening or straightening of shape memory flexural element upon heating above the phase change temperature motivates the system. Both first and second pivoting drive members and memory element displace in the direction which effects an increase in distance between points of attachment of shape memory element. Cooling the shape memory element below the phase change temperature, relaxes the wire and the spring means interconnecting the ends of the element supplies an opposing force to motivate oscillation now in the direction which effects a decrease in distance between points of attachment of the shape memory element. The cycle is then repeated until temperature degradation in the baths prevents a phase change from occuring in the shape memory element.

OBJECTS OF THE INVENTION

It is therefore an important object of the present invention to provide a unique single wire nitinol engine.

It is also an object of the present invention to provide a heat engine of a very simple design having a direct power takeoff.

And it is another object of the present invention to provide a demonstration nitinol engine which can be operated with hot and cold temperature baths which do not need to be supplied with recirculating fluids.

Other objects of the present invention will become apparent when the description of the preferred embodiment is considered in conjunction with the accompanying drawings.

DESCRIPTION OF THE DRAWINGS

FIG. 1 is a side elevation of a preferred embodiment of the present invention in partial section taken along lines 1—1 of FIG. 4;

FIG. 2 is a top plan view of FIG. 4;

FIG. 3 is also a top plan view of FIG. 4 with the wire element leaving the cold water bath; and FIG. 4 is an end elevation of FIG. 1.

DESCRIPTION OF THE PREFERRED EMBODIMENT

The present invention is a heat engine utilizing thermally responsive elements of a shape memory material. More specifically, it is a simple single wire nitinol engine combining the basic principals of my prior U.S. Pat. Nos. 3,913,326 and 4,563,876 in a highly modified and simplified form.

The thermally responsive nitinol wire element 11 which powers the invention is best viewed in FIG. 1 and has the memory property characteristic of closing and opening its flexure bend when thermally cycled. The wire is pre-worked in the hot state into a straight wire so that it tends to resume the straight configuration when heated above its phase change temperature. When it is cooled below its phase change temperature, it easily bends to shorten its arc especially when collapsed by a spring or the momentum of the mechanism.

The preferred embodiment of the laterally oscillating nitinol engine of the present invention includes a first L-shaped drive member 13 which is journalled for pivoting oscillation in the horizontal plane. The oscillation occurs about the juncture 15 of the legs of the L-shaped member. In the preferred embodiment, the L-shaped member can be made of plastic. If it is made of nylon or a similar substance, it contains natural lubricating properties which are advantageous in the oscillation journal and the sliding connection 17 formed at the end of the outboard end 19 of the long leg of the L. The outboard end is the one that swings in an arc while the inboard end oscillates about the pivot. A bearing block 21 is secured to the outboard end of the longer leg of the L-shaped member and has an oversized guide hole 17 formed therein. The bearing block 21 in the preferred embodiment is disposed in depending relation below the long leg of the L-shaped member and can be formed integral thereto.

A second drive member 23 is journalled for pivoting oscillation at a point 25 proximate the end of the shorter leg 27 of the L-shaped drive member and at a distance from the pivot journal 29 of the L-shaped member. The second drive member is arranged to extend through the guide hole in the bearing block and to reciprocate therein. In the preferred embodiment the second drive member includes a block portion 23 which is mounted on the pivot shaft and supports an extension shaft 31 which projects through the guide hole.

A shape memory alloy power element in the form of a nitinol wire 11 is disposed in flexure secured at its ends to the bearing block and to the second drive member. The connection 33 to the second member is disposed intermediate the sliding connection of the second member with the bearing block and the pivotal connection of the second member. The connections include eyelets 35 which encircle the extension shaft 31 so that they are free to slide thereon although only the outboard end connection 37 actually slides an appreciable distance on the shaft 31 during engine operation. The power element 11 does oscillate like a suspended swing with respect to the extension shaft when the engine operates.

A pair of different temperature baths 39 are disposed below the shape memory alloy element whereby as the drive members oscillate about their journals, the thermally responsive element is swung in a laterally oscillating motion and alternately dips into one bath and then the other. In the preferred embodiment a pair of wells are formed in the base structure of the engine to hold the hot and cold water baths. Hot tap water and ice water serve the purpose to alternate the nitinol above and below the phase change temperature.

A means is provided for absorbing a portion of the energy developed by the engine and to move the power element from the cold bath to the hot bath. In the preferred embodiment this is done by providing a spring means 41 such as a coil spring in tension interconnecting the ends of the power element. A flywheel 43 can be driven from a power takeoff 45 secured to the outboard end 47 of the shorter leg 27 of the L-shaped drive member and if it is large enough will render the spring means unnecessary.

Thus, the present invention is a very simple single wire nitinol engine, and it will be seen from the foregoing description that all the objects and advantages claimed therefor are achieved. While the apparatus of the present invention has been described in considerable detail, many modifications and improvements should be obvious to one skilled in the art. Thus, it is not to be limited to the details as set forth herein except as may be necessitated by the appended claims.

I claim:

1. A laterally oscillating nitinol engine comprising
   a first L-shaped drive member journalled for pivoting horizontal oscillation about the juncture of the legs of the L-shaped member,
   a second drive member journalled for pivoting about a point proximate the outboard end of the shorter leg of the L-shaped member at a distance from the pivot journal of the L-shaped member,
   a bearing block secured to the end of longer leg of the L-shaped member and having a guide hole therethrough, said second member extending through said guide hole and arranged to reciprocate therein,
   a shape memory alloy power element disposed in flexure secured at its ends to said bearing block and to said second member intermediate the sliding connection with said bearing block and the pivotal connection of said second member,
   means for disposing different temperature baths below said element whereby as said drive members oscillate about their journals the element alternately dips into one bath and then the other, and
   means for absorbing a portion of the energy developed by the engine and moving the power element from the cold bath to the hot bath.

2. The laterally oscillating nitinol engine of claim 1 wherein the means for absorbing a portion of the energy to move the drive element from the cold bath to the hot bath includes a spring means in tension interconnecting the ends of said shape memory element.

3. The laterally oscillating nitinol engine of claim 1 including an energy absorption and storage means connected to said drive members.

* * * * *